United States Patent [19]
MacLeod

[11] Patent Number: 5,725,641
[45] Date of Patent: Mar. 10, 1998

[54] LIGHTFAST INKS FOR INK-JET PRINTING

[76] Inventor: Cheryl A. MacLeod, 5215 SW. Blueberry, Corvalllis, Oreg. 97333

[21] Appl. No.: 741,880

[22] Filed: Oct. 30, 1996

[51] Int. Cl.$^6$ .................................................. C09D 11/02
[52] U.S. Cl. .......................... 106/31.5; 534/763; 534/764; 534/617
[58] Field of Search ..................... 106/22 K, 20 D, 106/31.5; 534/763, 764, 617

[56] References Cited

U.S. PATENT DOCUMENTS

| | | | |
|---|---|---|---|
| 4,694,302 | 9/1987 | Hackleman et al. | 346/1.1 |
| 5,062,892 | 11/1991 | Halko | 106/22 |
| 5,102,459 | 4/1992 | Ritter et al. | 106/22 K |
| 5,118,350 | 6/1992 | Prasad | 106/22 |
| 5,165,968 | 11/1992 | Johnson et al. | 427/288 |
| 5,534,051 | 7/1996 | Lauw | 106/22 |
| 5,536,306 | 7/1996 | Johnson et al. | 106/22 |

*Primary Examiner*—Helene Klemanski
*Attorney, Agent, or Firm*—Soodabeh Tronson

[57] ABSTRACT

Aqueous inks are provided for use in vehicles employing from about 10 to about 40 wt % of one or more organic solvents; and optionally up to about 5 wt % of an additive independently selected from the group consisting of surfactant, buffer, biocide, and mixtures thereof. The inks comprise, by weight, from about 1 to about 10 wt % Reactive Black 31 dye in either or both of its hydrolyzed forms, namely vinyl sulfone form and ethyl hydroxy form. Ink-jet inks made using the Pacified Reactive Black 31 provide improved lightfastness across a range of printing media while providing reliable ink-jet pen performance.

36 Claims, 3 Drawing Sheets

LIGHTFAST INKS FOR INK-JET PRINTING

FIELD OF INVENTION

The present invention generally relates to ink compositions for ink-jet printers and, more particularly, to lightfast ink compositions possessing reliable ink-jet pen performance.

BACKGROUND OF THE INVENTION

The use of ink-jet printing systems has grown dramatically in recent years. This growth may be attributed to substantial improvements in print resolution and overall print quality, coupled with appreciable reduction in cost. Today's ink-jet printers offer acceptable print quality for many industrial, commercial, business, and residential applications at costs fully an order of magnitude lower than comparable products available just a few years ago. Notwithstanding their recent success, intensive research and development efforts continue toward improving lightfastness of ink-jet images. In general, lightfastness of ink-jet images still falls short of that produced by other technologies such as electrophotography or gravure printing. A continued demand in ink-jet printing has resulted in the need to develop reliable printers capable of producing high quality lightfast images at a reasonable cost.

An ink-jet image is formed when a precise pattern of dots is ejected from a drop generating device known as a "printhead" onto a printing medium. The typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 µm×35 µm. The printhead is held and protected by an outer packaging referred to as a print cartridge, i.e., ink-jet pen.

Upon energizing of a particular resistor element, a droplet of ink is expelled through the nozzle toward the print medium, whether paper, transparent film, or the like. The firing of ink droplets is typically under the control of a microprocessor, the signals of which are conveyed by electrical traces to the resistor elements, thereby forming alphanumeric and other characters on the print medium.

The tight tolerances of the nozzles, typically 30 to 40 µm diameter require that the ink not clog the nozzles. Further, repeated firings of the resistor elements which must withstand many millions of firings over the life of the ink cartridge to be commercially practical, can result in fouling of the resistor elements and degrading pen performance. This build up of residue on the resistor elements is unique to ink-jet printers and is known as kogation and defined as the build-up of residue (koga) on the resistor surface. The ink composition must be capable of interacting with the print medium, especially paper, to penetrate the paper without undue spreading and a subsequent decrease in print quality. Furthermore, in order to maintain the integrity of the printed image over time, it is important that the colorant is lightfast. Inks are known which possess one or more of the foregoing properties.

However, few ink compositions are known that possess all the foregoing desired properties, since an improvement in one property often results in the degradation of another property. For example, U.S. Pat. Nos. 4,694,302 and 5,062,892 disclose dyes such as Food Black 2 and ICI (now Zeneca) 286/287 for use in black ink-jet inks. Although these inks have been useful in the past, they either suffer from extremely poor lightfastness or slight lightfastness improvements at the expense of ink-jet pen (print cartridge) performance.

Thus, many inks commercially used represent a compromise in an attempt to achieve an ink evidencing at least an adequate response in each of the performance attributes, such as lightfastness and pen performance. None of these inks offers both outstanding lightfastness and acceptable pen performance.

Accordingly, investigations continue into developing ink formulations which have improved properties and which do not improve one property at the expense of the others. Thus, challenge remains to further improve the lightfastness of the ink-jet prints without sacrificing pen performance and reliability.

SUMMARY OF THE INVENTION

The present invention is directed to black inks that are particularly suitable for ink-jet printing over a range of plain and coated papers and other printing media. These inks exhibit very good lightfastness across a range of media and across a range of dye loads. Furthermore, the improvement in lightfastness is achieved without sacrificing pen performance. The inks of the present invention comprise a dye having the formula:

FORMULA I wherein X is —CH₂—CH₂—O—H, or —CH₂=CH₂, or mixtures thereof.

Aqueous inks of this invention comprise, by weight, from about 1 to about 10 wt % dye; from about 10 to about 40 wt % of one or more organic solvents; and optionally up to about 5 wt % of an additive independently selected from the group consisting of surfactant, buffer, biocide, and mixtures thereof.

DETAILED DESCRIPTION OF THE INVENTION

The invention described herein is directed to hydrolyzed forms of a specific black dye employed in inks for use in commercially available ink-jet printers such as DESKJET® printers, manufactured by Hewlett-Packard Company, of Palo Alto, Calif.; and other commercially available home or office ink-jet printers. The use of these hydrolyzed dyes in ink-jet ink compositions enables the printer to produce lightfast images without sacrificing pen reliability and performance.

The Reactive Black 31 dye (KB31) is a lightfast dye which in its reactive form, Formula II, is unsuitable for use in ink-jet ink compositions.

FORMULA II

At neutral pH, this reactive dye is unstable, i.e., it hydrolyzes over time, resulting in inks having a lower pH and increased sulfate ions. This hydrolysis negatively affects the reliability of the ink-jet print cartridge containing the ink, as evidenced by the performance results in FIGS. 4 and 5. The dyes useful in this invention having Formula I can be prepared by pacification of the reactive dye of Formula II. Both forms of Pacified RB31 (PRB31), namely, the vinyl sulfone form and the ethyl hydroxy form, are suitable for use in ink-jet printing and maintain the lightfast properties of the RB31, since the pacification process does not affect the chromophore. The aqueous inks of this invention comprise, by weight, from about 1 to about 10 wt % dye; from about 10 to about 40 wt % of one or more organic solvents; and optionally up to about 5 wt % of an additive independently selected from the group consisting of surfactant, buffer, biocide, and mixtures thereof.

DYE

Reactive Black 31 dye (RB31) is commercially available from vendors such as Hoechst Chemical Company and Bayer as Remazol Black RL Reactive Black 31. The RB31 dye may be in its salt form, such as an alkali metal (Na, K, or Li) or amine. Some of these salt forms, such as Na, are commercially available. Other salt forms can be made using well known techniques.

The dyes of the present invention are made by the pacification of RB31 dye, employing well know pacification methods. The pacification process is accomplished by making an aqueous solution of Reactive Black 31. The aqueous solution is heated to 60° C. The dye is then hydrolyzed by addition of sodium hydroxide in amounts sufficient to bring the pH of the solution to a range of about 8 to about 12. The pH is maintained at this range by further additions of sodium hydroxide to the solution. After the completion of the hydrolysis, the pH of the solution is lowered to about 7 using hydrochloric acid. The sulfate ions generated in the reaction, and the chloride and sodium ions added during the process, can optionally be removed by reverse osmosis or other conventional methods. The inks of present invention preferably contain less than about 1 wt % sulfate ion. More preferably the inks contain less than about 1000 parts per million sulfate ion, with less than about 100 parts per million being the most preferred..The resulting pacified dye solution will contain either or both the hydrolyzed forms, namely, vinyl sulfone form and ethyl hydroxy form. Both hydrolyzed forms of PRB 31 are lightfast and suitable to make reliable ink-jet inks. The dye is present in an amount from about 1 to about 10 wt. %, preferably, from about 5 to about 10 wt. %, and most preferably, from about 7 to about 10 wt. %.

ORGANIC SOLVENT

The inks of the present invention comprise from about 10 to about 40 wt % of at least one organic solvent. More preferably the inks comprise from about 15 to about 30 wt % of at least one organic solvent with from about 20 to about 25 wt % being the most preferred.

The water soluble organic solvents suitably employed in the present ink-jet ink compositions include any of, or a mixture of two or more, of such compounds as nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols, (e.g., 1-2-ethandiol), propanediols (e.g., 1,2-propanediol, 1,3-propanediol, 2-ethyl-2-hydroxy-methyl-1,3-propanediol, ethylhydroxy-propanediol (EHPD)), butanediols (e.g., 1,2-butanediol, 1,3-butanediol, 1,4-butanediol), pentanediols (e.g., 1,5-pentanediol), hexanediols (e.g., 1,6-hexanediol, 2,5-hexanediol), heptanediols (e.g., 1,2-heptanediol, 1,7-heptanediol), octanediols (e.g., 1,2-octanediol, 1,8-octainediol); and glycol ethers and thioglycol ethers, commonly employed in ink-jet inks, such as polyalkylene glycols such as polyethylene glycols (e.g., diethylene glycol (DEC), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol. Preferably 1,5-pentanediol, 2-pyrrolidone, NMP, DEG, and EHPD are employed in the practice of the invention with 1,5-pentanediol, 2-pyrrolidone, and ethylhydroxy-propanediol being the most preferred solvents at preferably a ratio of about 1:1:1.

SURFACTANT

The inks of the present invention optionally comprise up to about 5 wt % surfactant. More preferably the inks comprise from about 1 to about 4 wt % surfactant with from about 2 to about 3 wt % being the most preferred.

In the practice of the invention, the secondary alcohol ethoxylates serve to prevent color to color bleed by increasing the penetration of the inks into the print medium. Secondary alcohol ethoxylates are nonionic surfactants and are commercially available, for example, from Union Carbide Co. (Houston, Tex.) as the Tergitol series, such as TERGITOL 15-S-5 and TERGITOL 15-S-7.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have from about 12 to about 18 carbon atoms in the aliphatic chain, while the number of ethoxylated units is predominantly in the range of from about 4 to about 8 units. Thus, "Tergitol 15-S-7" represents a secondary alcohol ethoxylate surfactant predominantly having about 15 carbons in its aliphatic chain and about 7 ethoxylated units. TERGITOL 15-S-7 and TERGITOL 15-S-5 are the preferred surfactant with TERGITOL 15-S-7 being the most preferred.

BUFFER

The inks of the present invention optionally comprise up to about 5 wt % buffer. More preferably the inks comprise up to about 1 wt % buffer with a concentration up to about 0.5 wt % being the most preferred.

Buffers employed in the practice of the invention to modulate pH can be organic-based biological buffers, or inorganic buffers such as sodium phosphate. Furthermore, the buffer employed should provide a pH ranging from about 6 to about 9 in the practice of the invention, preferably from about 6.5 to about 8 and most preferably from about 6.7 to about 7.1. Examples of preferably-employed organic buffers include Trizma Base, available from companies such as Aldrich Chemical (Milwaukee, Wis.), 4-morpholineethanesulfonic acid (MES), and 4-morpholinepropanesulfonic acid (MOPS). Most preferably MES is employed in the practice of the invention.

BIOCIDE

The inks of the present invention optionally comprise up to about 5 wt % biocide. More preferably the inks comprise up to about 1 wt % biocide with concentration up to about 0.2 wt % being the most preferred.

Any of the biocides commonly employed in ink-jet inks may be employed in the practice of the invention, such as NUOSEPT 95, available from Hals America (Piscataway, N.J.); PROXEL GXL, available from Zeneca (Wilmington, Del.); and glutaraldehyde, available from Union Carbide Company (Bound Brook, N.J.) under the trade designation UCARCIDE 250. PROXEL GXL is the preferred biocide.

EXAMPLES

Inks were prepared, in which the vehicle comprised the following composition in wt %:

| | |
|---|---|
| 1,5-pentanediol | 8% |
| EHPD | 7.5% |
| 2-pyrrolidone | 7.5% |
| Tergitol 15-S-7 | 2.2% |
| MES | 0.2% |
| pH | 6.0–6.5 |
| water | balance |

Table I indicates the different black ink sets that were made by mixing various dyes with the above vehicle.

TABLE I

Ink Sets Evaluated

| INK SET | BLACK DYE |
|---|---|
| 1 | Na-Reactive Black 31 |
| 2 | Pacified Reactive Black 31 |

TABLE I-continued

Ink Sets Evaluated

| INK SET | BLACK DYE |
|---|---|
| 3 | Food Black 2 (Bayer) |
| 4 | Na-286/287 (Zeneca Colours) |
| 5 | NH$_4$-286/287 (Zeneca Colours) |
|   | Ink Black Ras Liquid PF075 (sulfur black from Sandoz) |
| 6 | Duasyn Black S-SF VP 2086 (sulfur black from Hoechst) |

The dyes used included Reactive Black (RB31) dye and Pacified Reactive Black (PRB31). Each ink set comprised five different dye loads: 0.1, 0.15, 0.2, 0.25, and 0.3, as determined by the maximum UV-vis absorbance at 1:10,000 dilution. For comparison and better evaluation of the advantages of the inks of the present invention, additional inks using other black dyes were also prepared. These additional black dyes are either employed in commercially available ink-jet printers or are black dyes having acceptable lightfast properties. Sulfur blacks, PF075 and S-SF VP 2162, were made at only one dye load of 0.15.

EVALUATION

Three different qualities of the formulated inks were measured in an effort to assess the benefits attained in the practice of the invention, namely, (a) "lightfade" across a range of print media and across a range of dye loads; and (b) "short term decap performance", and (c) "nozzle recovery after storage" as measures of ink-jet pen reliability and performance.

LIGHTFADE

Figure 1:
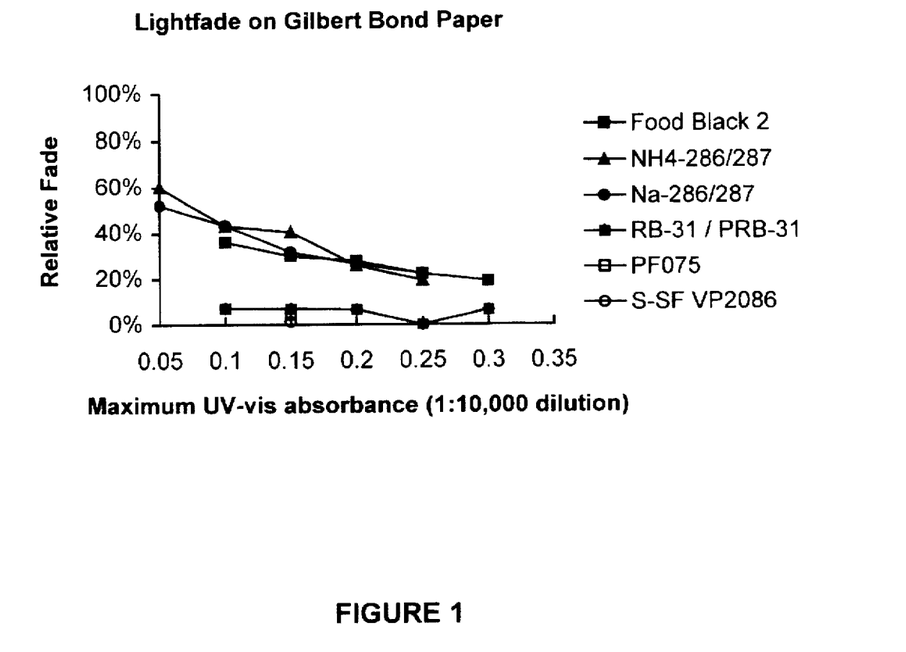
FIG. 1 is a plot of relative lightfade on Gilbert Bond paper versus dye load (maximum UV-vis absorbance) for inks of this invention compared to other inks, depicting the improvement in lightfade as a result of the invention.
Figure 2:
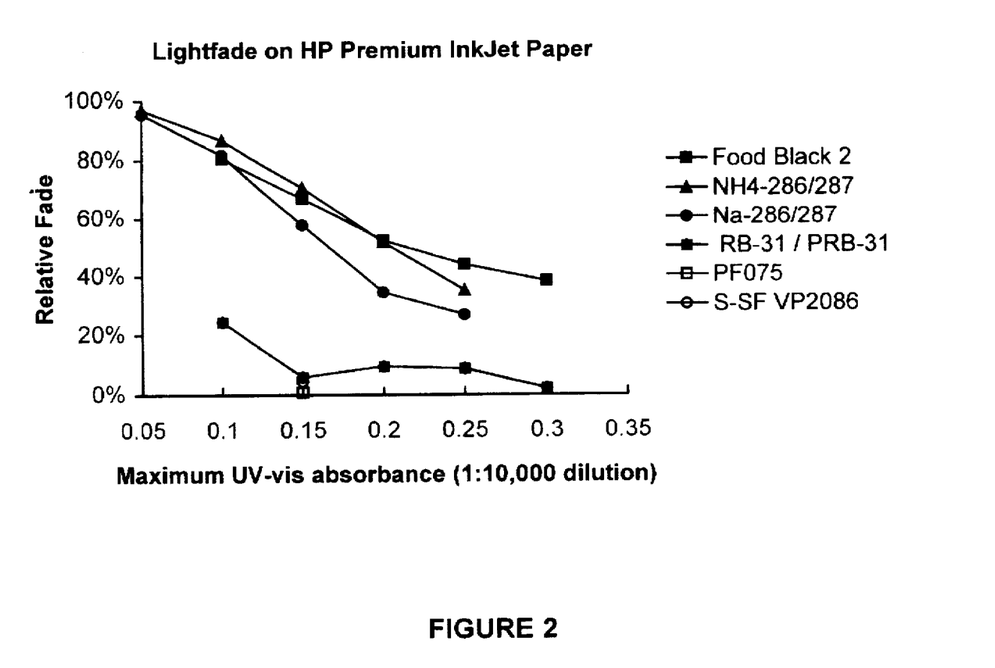
FIG. 2 is a plot of relative lightfade on Hewlett-Packard Premium Ink-Jet Paper versus dye load (maximum UV-vis absorbance) for inks of this invention compared to other inks, depicting the improvement in lightfade as a result of the invention.
Figure 3:
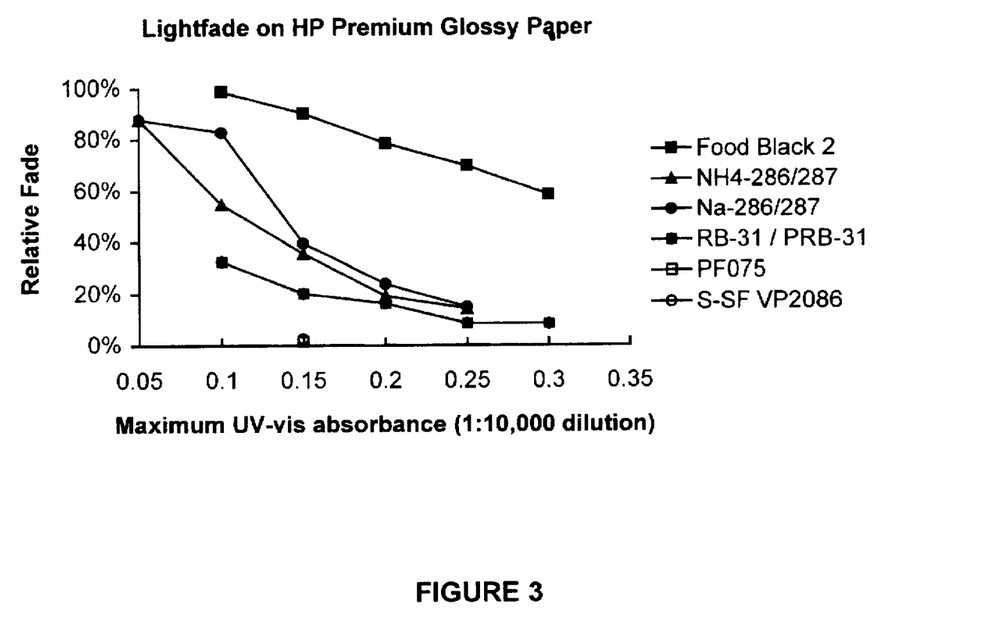
FIG. 3 is a plot of relative lightfade on Hewlett-Packard Premium Ink-Jet Glossy Paper versus dye load (maximum UV-vis absorbance) for inks of this invention compared to other inks, depicting the improvement in lightfade as a result of the invention.

Lightfade was measured for the formulated inks on the papers listed in Table II and is reported in FIGS. 1 through 3. Reactive Black 31 in its original form was not tested for lightfastness since its lightfast properties are the same as the pacified form, i.e., the hydrolysis reaction does not affect the chromophore. Lightfade for the two sulfur dyes, PF075 and S-SF VP 2162, was only tested at one dye load of 0.15.

TABLE II

Paper Used for Lightfade Evaluation

| PAPER | PAPER ID |
|---|---|
| 1 | Gilbert Bond (bond paper by Mead) |
| 2 | Hewlett-Packard Premium Ink-Jet Paper, part number 51634Y |
| 3 | Hewlett-Packard Premium Ink-Jet Glossy Paper, part number C3836A |

Lightfade was measured by printing two sheets for various ink/dye load/media combinations using a Hewlett-Packard DeskJet 660C printer and Hewlett-Packard print cartridge (ink-jet pen) part number 51649A, both commercially available from Hewlett-Packard Company of Palo Alto, Calif. One of the print samples was placed in the dark and the other was exposed to the equivalent of one year of office light using an Atlas Fade-ometer. The optical density, OD, of the inks on the two sheets were measured using a MacBeth Densitometer, made by the MacBeth Division of Kollmorgen Instruments Corporation of New York, using standard color measurement procedures. Relative lightfade of each sample was calculated using Equation 1 below:

$$((OD \text{ before fade} - OD \text{ after fade})/(OD \text{ before fade})) * 100 \quad \text{Equation 1}$$

It is desirable that the lightfade value be minimized. As evidenced by the values in FIGS. 1 through 3, each of the inks formulated in accordance with the present invention had significantly lower lightfade values. It should be noted that that the inks of the present invention demonstrated improved lightfastness (lower lightfade) across the media set. Furthermore, the inks of the present invention displayed improved lightfastness across the range of dye loads. Both of these features, namely, improvement in lightfastness across the media set and across dye loads, are important in designing ink-jet printing systems. For example, the former feature expands the range of acceptable media, while the latter feature enables ink-jet printing systems requiring lower dye loads to benefit from the improved lightfastness of the inks of present invention.

INK-JET PEN RELIABILITY

The formulated inks were filled into ink-jet print cartridges, part number 51649A available from Hewlett-Packard Co., of Palo Alto, Calif. All ink-filled pens were tested to ensure that all nozzles were in working condition. The inks were printed on bond paper by means of a Hewlett-Packard DESKJET 660C printer (DeskJet is a trademark of Hewlett-Packard Company). The reliability of each ink-filled pen was then determined by two tests, namely, "short term decap performance" and "nozzle recovery after storage performance."

SHORT TERM DECAP PERFORMANCE

Figure 4:
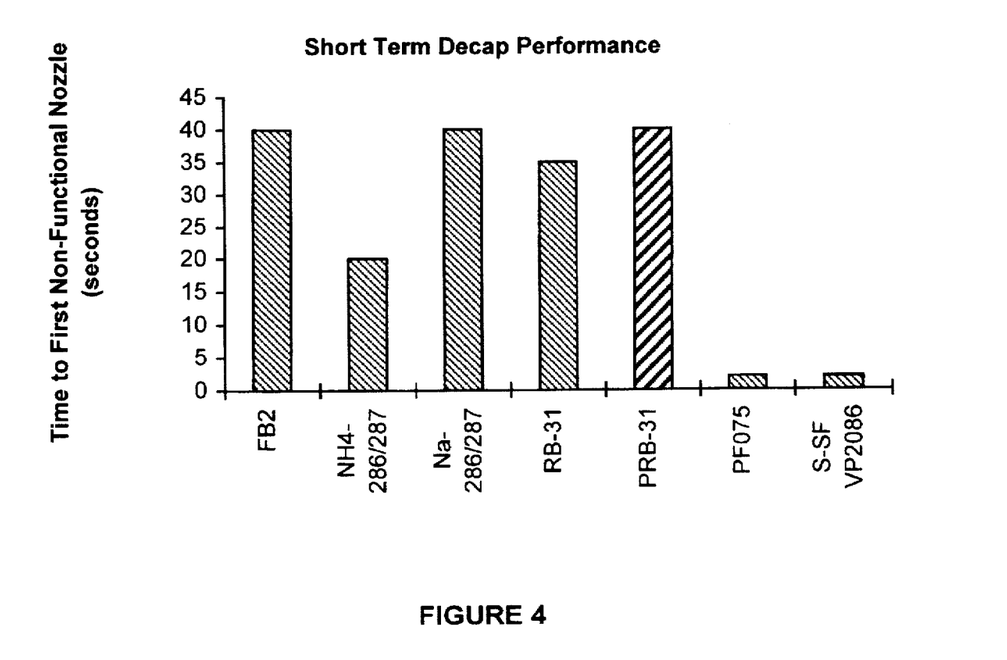
FIG. 4 is a plot of time to first non-functional nozzle versus ink type, illustrating the short term decap performance for inks of this invention compared to other inks, depicting the increase in non-firing time a nozzle can withstand as a result of the invention.
Figure 5:
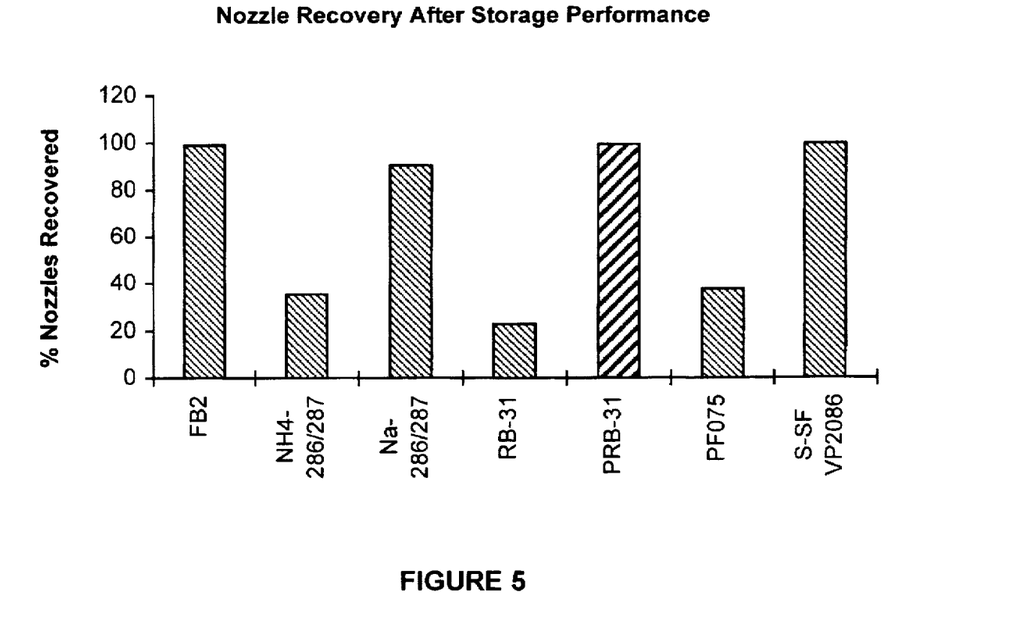
FIG. 5 is a plot of percent nozzles recovered versus ink type, illustrating the recovery from a 3 day storage for inks of this invention compared to other inks, depicting the improvement in nozzle recovery as a result of the invention.

This test measured the period of inoperativeness a nozzle can tolerate without a defect. The ink-filled pens were placed in the printer and used to print a "print file" with a predetermined print pattern. The print file was set to cause the nozzles to pause between successive ink drop ejections for predetermined periods of time. The printed nozzle pattern was examined for defects such as weak, misdirected, or missing nozzles. The longest inoperative time that a nozzle could withstand between resistor firings without a defect is reported as short term decap. It is desirable that the nozzles tolerate long periods of elapsed time between resistor firings. The results are illustrated in FIG. 4. As can be noted, PRB-31 had a short term decap performance of 40 seconds along with two other inks, namely Food Black 2 and Na-286/287.

NOZZLE RECOVERY AFTER STORAGE PERFORMANCE

This test measured the level of nozzle recovery after the nozzles had been idle for an extended period of time. The ink-filled pens were placed outside the printer for three days. The nozzles were untaped and exposed to ambient air. The ink-filled pens were used to print a predetermined "print file." Following the three day storage of the untaped pens outside of the printer, the pen performance was evaluated by measuring the percentage of nozzles that recovered after firing the pen resistors 5000 times. A nozzle was considered to have recovered once it fired drops of the proper size in the proper location on a nozzle diagnostic pattern printed on paper. The nozzle recovery data is reported in FIG. 5. It is desirable that 100% of the nozzles recover. As evidenced by the values in FIG. 5, each of the inks formulated in accordance with the present invention have significantly higher nozzle recovery along with Food Black 2 and S-SF VP 2162. Furthermore, as can be noted from the data in FIG. 5, RB31 had a very poor performance.

Figure 6:
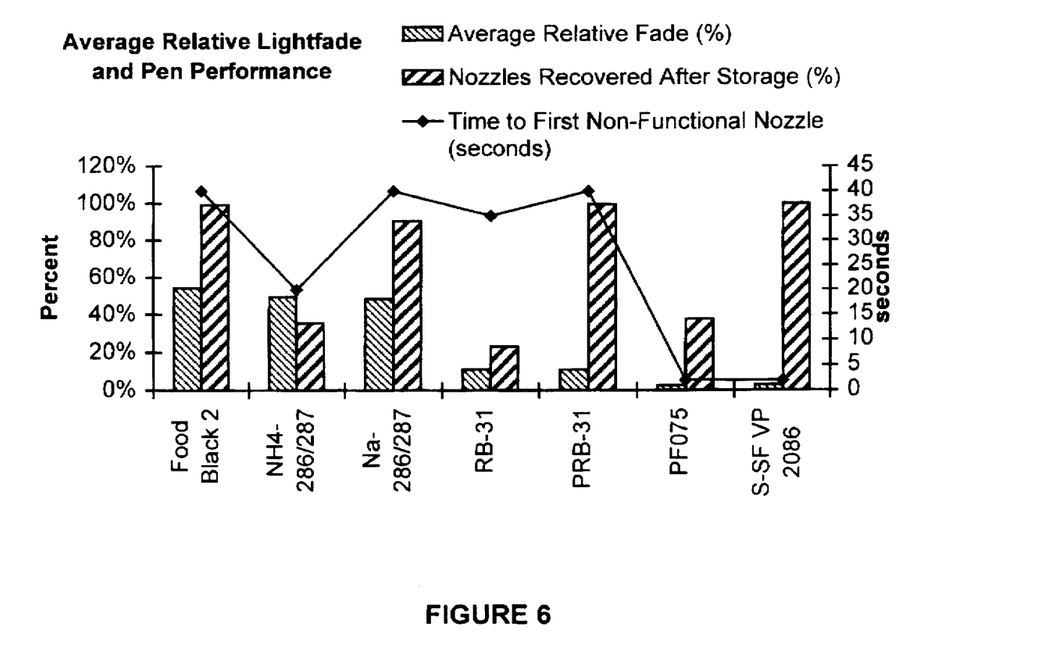
FIG. 6 is a plot summarizing the lightfastness (% average relative lightfade), short term decap performance (% nozzles recovered after storage), and nozzle recovery after storage performance (time to first non-functional nozzle) for the inks of the present invention compared to other inks, depicting the combined improvement in lightfade and pen performance as a result of the invention.

FIG. 6 represnts the lightfastness (% average relative lightfade), short term decap performance (% nozzles recovered after storage), and nozzle recovery after storage per- formance (time to first non-functional nozzle) for the inks of the present invention compared to other inks, depicting the combined improvement in lightfade and pen performance as a result of the invention. As can be noted, only inks made according to the present invention have the benefit of both lightfastness and pen reliability. It should be noted that the y-axis labeled "percent" reflects the "% average relative fade" and "% nozzles recoverd after storage" while the y-axis labeled "seconds" reflects the "time to first non-functional nozzle".

The printed images using the inks of the present invention preferably have an average lightfade of less than about 40%, more preferably less than about 30%, and most preferably less than about 20%. Furthermore, the inks of the present invention preferably have a short term decap performance of greater than about 15 seconds, more preferably greater than about 25 seconds, and most preferably greater than about 35 seconds. Additionally, the inks of the present invention preferably have a nozzle recovery after storage performance of greater than about 30%, more preferably greater than about 60%, and most preferably greater than about 90%.

The benefits of the present invention become obvious when the pen reliability and lightfade data are evaluated together. The results presented here demonstrate that only inks made according to the present invention have the benefit of both lightfastness and pen reliability. Furthermore, the lightfastness is exhibited across a media range and across different dye loads, especially at low dye concentrations.

What is claimed is:

1. An ink-jet ink composition comprising:
   from about 1 to about 10 wt % dye having the formula wherein X is —CH$_2$—CH$_2$—O—H, or —CH=CH$_2$, or mixtures thereof.

2. The ink of claim 1, wherein the concentration of said dye is from about 5 to about 10 wt %.

3. The ink of claim 1, wherein the concentration of said dye is from about 7 to about 10 wt %.

4. The ink of claim 1, wherein said ink contains less than about 1 wt % sulfate ion.

5. The ink of claim 1, wherein said ink contains less than about 1000 parts per million sulfate ion.

6. The ink of claim 1, wherein said ink contains less than about 100 parts per million sulfate ion.

7. The ink of claim 1, further comprising:
   from about 10 to about 40 wt % of an organic solvent; and
   optionally up to about 5 wt % of an additive independently selected from the group consisting of surfactant, biocide, buffer, and mixtures thereof.

8. The ink of claim 7, wherein:
   the organic solvent is present in an amount from about 15 to about 30 wt %;
   the surfactant is present in an amount from about 1 to about 4 wt %;
   the biocide is present in an amount up to about 1 wt %; and
   the buffer is present in an amount up to about 1 wt %.

9. The ink of claim 7, wherein:
   the organic solvent is present in an amount from about 20 to about 25 wt %;
   the surfactant is present in an amount from about 2 to about 3 wt %;
   the biocide is present in an amount up to 0.2 wt %; and
   the buffer is present in an amount up to 0.5 wt %.

10. The ink of claim 7, wherein:
    the organic solvent is selected from the group consisting of nitrogen-containing heterocyclic ketones, diols, glycols, and mixtures thereof; and
    the surfactant comprises at least one secondary alcohol ethoxylate surfactant predominantly having from about 4 to about 8 ethoxylated units and an aliphatic chain from about 12 to about 18 carbon atoms.

11. The ink of claim 7, wherein:
    the organic solvent is selected from the group consisting of 1,5-pentanediol, 2-pyrrolidone, N-methyl-pyrrolid-2-one, ethylhydroxy-propanediol, diethylene glycol, and mixtures thereof; and
    the surfactant comprises at least one secondary alcohol ethoxylate surfactant predominantly having from about 5 to about 7 ethoxylated units and an aliphatic chain from about 14 to about 16 carbon atoms.

12. The ink of claim 7, wherein:
    the organic solvent is selected from the group consisting of 1,5-pentanediol, 2-pyrrolidone, ethylhydroxy-propanediol, and a 1:1:1 mixture thereof; and the surfactant comprises at least one secondary alcohol ethoxylate surfactant predominantly having about 7 ethoxylated units and an aliphatic chain of about 15 carbon atoms.

13. A method for printing ink-jet images having improved lightfastness using an ink-jet printer, comprising the steps of:
    providing an ink-jet ink comprising from about 1 to about 10 wt % dye having the formula wherein X is —CH$_2$—CH$_2$—O—H, or —CH=CH$_2$, or mixtures thereof; and printing said ink-jet ink composition on a printing medium by means of an ink-jet pen.

14. The method of claim 1, wherein the concentration of said dye is from about 5 to about 10 wt %.

15. The method of claim 13, wherein the concentration of said dye is from about 7 to about 10 wt %.

16. The method of claim 13, wherein said ink contains less than about 1 wt % sulfate ion.

17. The method of claim 13, wherein said ink contains less than about 1000 parts per million sulfate ion.

18. The method of claim 13, wherein said ink contains less than about 100 parts per million sulfate ion.

19. The method of claim 13, wherein said ink further comprises:

from about 10 to about 40 wt % of an organic solvent; and optionally up to about 5 wt % of an additive independently selected from the group consisting of surfactant, biocide, buffer, and mixtures thereof.

20. The method of claim 19, wherein:

the organic solvent is present in an amount from about 15 to about 30 wt %;

the surfactant is present in an amount from about 1 to about 4 wt %;

the biocide is present in an amount up to about 1 wt %; and the buffer is present in an amount up to about 1 wt %.

21. The method of claim 19, wherein:

the organic solvent is present in an amount from about 20 to about 25 wt %;

the surfactant is present in an amount from about 2 to about 3 wt %;

the biocide is present in an amount up to 0.2 wt %; and the buffer is present in an amount up to 0.5 wt %.

22. The method of claim 19, wherein:

the organic solvent is selected from the group consisting of nitrogen-containing heterocyclic ketones, diols, glycols, and mixtures thereof; and the surfactant comprises at least one secondary alcohol ethoxylate surfactant predominantly having from about 4 to about 8 ethoxylated units and an aliphatic chain from about 12 to about 18 carbon atoms.

23. The method of claim 19, wherein:

the organic solvent is selected from the group consisting of 1,5-pentanediol, 2-pyrrolidone, N-methyl-pyrrolid-2-one, ethylhydroxy-propanediol, diethylene glycol, and mixtures thereof; and the surfactant comprises at least one secondary alcohol ethoxylate surfactant predominantly having from about 5 to about 7 ethoxylated units and an aliphatic chain from about 14 to about 16 carbon atoms.

24. The method of claim 19, wherein:

the organic solvent is selected from the group consisting of 1,5-pentanediol, 2-pyrrolidone, ethylhydroxy-propanediol, and a 1:1:1 mixture thereof; and the surfactant comprises at least one secondary alcohol ethoxylate surfactant predominantly having about 7 ethoxylated units and an aliphatic chain of about 15 carbon atoms.

25. An ink-jet ink composition for printing ink-jet images having improved lightfastness, comprising:

a black ink for printing ink-jet images having an average lightfade of less than about 40%, said ink having a short term decap performance of greater than about 15 seconds and a nozzle recovery after storage performance of greater than about 30%.

26. The ink of claim 25, wherein:

said ink has a short term decap performance of greater than about 25 seconds and a nozzle recovery after storage performance of greater than about 60%.

27. The ink of claim 25, wherein:

said ink has a short term decap performance of greater than about 35 seconds and a nozzle recovery after storage performance of greater than about 90%.

28. The ink of claim 25, 26, or 27, wherein the average lightfade is less than about 30%.

29. The ink of claim 25, 26, or 27, wherein the average lightfade is less than about 20%.

30. The ink of claim 25, 26, or 27, wherein:

said black ink comprises from about 1 to about 10 wt % dye having the formula wherein X is —CH$_2$—CH$_2$—O—H, or —CH=CH$_2$—, or mixtures thereof.

31. A method for printing ink-jet images having improved lightfastness using an ink-jet printer comprising the steps of:

providing a black ink having a short term decap performance of greater than about 15 seconds and a nozzle recovery after storage performance of greater than about 30%; and printing an ink-jet image using said ink on a printing medium by means of an ink-jet pen, said image having an average lightfade of less than about 40%.

32. The method of claim 31, wherein:

said ink has a short term decap performance of greater than about 25 seconds and a nozzle recovery after storage performance of greater than about 60%.

33. The method of claim 31, wherein:

said ink has a short term decap performance of greater than about 35 seconds and a nozzle recovery after storage performance of greater than about 90%.

34. The method of claim 31, wherein:

said ink has a short term decap performance of greater than about 35 seconds and a nozzle recovery after storage performance of greater than about 90%; and the printed image has an average lightfade of less than about 30%.

35. The method of claim 31, wherein:

said ink has a short term decap performance of greater than about 35 seconds and a nozzle recovery after storage performance of greater than about 90%; and the printed image has an average lightfade of less than about 20%.

36. The method of claim 31, 32, or 33, wherein:

said ink comprises from about 1 to about 10 wt % dye having the formula wherein X is —CH$_2$—CH$_2$—O—H, or —CH=CH$_2$, or mixtures thereof.

* * * * *

UNITED STATES PATENT AND TRADEMARK OFFICE
CERTIFICATE OF CORRECTION

PATENT NO. : 5,725,641
DATED : March 10, 1998
INVENTOR(S) : Cheryl MacLeod

It is certified that error appears in the above-identified patent and that said Letters Patent is hereby corrected as shown below:

Column 4, line 11 of the Patent, delete "(KB31)", insert --(RB31)--.
Column 4, Formula II, that portion of the formula reading $SO_2CH_2CH_2OCO_3$ should read $SO_2CH_2CH_2OSO_3$.
Column 3, line one of the Patent, delete "-$CH_2=CH_2$", insert -- -$CH=CH_2$ --
Column 7, line 9 of Table I, insert --6-- in the Ink Set column.
Column 7, line 10 of Table I, delete "6", insert --7-- in the Ink Set column.
Column 7, line 21 of the Patent, delete "2162", insert --2086--.
Column 7, line 39 of the Patent, delete "2162", insert --2086--.
Column 8, line 62 of the Patent, delete "2162", insert --2086--.
Column 8, line 65 of the Patent, delete "represnts", insert --represents--.
Column 9, line 8 of the Patent, delete "recoverd", insert --recovered--.

Signed and Sealed this

Twentieth Day of October, 1998

*Attest:*

BRUCE LEHMAN

*Attesting Officer*   *Commissioner of Patents and Trademarks*